United States Patent
An et al.

(10) Patent No.: US 9,563,595 B2
(45) Date of Patent: Feb. 7, 2017

(54) EDP INTERFACE AND CONTROL METHOD OF TRANSMISSION RATE OF EDP INTERFACE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Na An, Beijing (CN); Yang Zhang, Beijing (CN); Yonghua Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 181 days.

(21) Appl. No.: 14/677,117

(22) Filed: Apr. 2, 2015

(65) Prior Publication Data

US 2015/0316951 A1    Nov. 5, 2015

(30) Foreign Application Priority Data

May 5, 2014 (CN) .......................... 2014 1 0186384

(51) Int. Cl.
*G06F 1/04* (2006.01)
*G06F 1/08* (2006.01)
*G06F 13/40* (2006.01)
*G09G 3/20* (2006.01)

(52) U.S. Cl.
CPC ............. *G06F 13/4068* (2013.01); *G06F 1/08* (2013.01); *G09G 3/2092* (2013.01); *G09G 2320/064* (2013.01); *G09G 2370/10* (2013.01)

(58) Field of Classification Search
CPC ...... G06F 1/08; G06F 13/4068; G09G 3/2092; G09G 2320/064; G09G 2370/10
See application file for complete search history.

(56) References Cited

U.S. PATENT DOCUMENTS

| 9,078,028 B2* | 7/2015 | Panich ............... H04N 13/0497 |
| 2013/0050216 A1* | 2/2013 | Whitby-Strevens .... G06F 13/14 345/428 |

* cited by examiner

*Primary Examiner* — Mark Connolly
(74) *Attorney, Agent, or Firm* — Nath, Goldberg & Meyer; Joshua B. Goldberg

(57) ABSTRACT

The present invention discloses an eDP interface, including: a determination module, a clock signal generating module, a clock signal adjusting module, a first eDP data processing chip and a second eDP data processing chip. When the determination module determines that a target transmission rate is not equal to a protocol rate, the clock signal generating module generates a first clock signal and a second clock signal. The clock signal adjusting module adjusts the frequency of the second clock signal. The first and second eDP data processing chips process data according to the first and second clock signals, respectively.

10 Claims, 3 Drawing Sheets

EDP INTERFACE AND CONTROL METHOD OF TRANSMISSION RATE OF EDP INTERFACE

FIELD OF THE INVENTION

The present invention relates to the field of display technology, and in particular relates to an eDP interface and a control method of a transmission rate of the eDP interface.

BACKGROUND OF THE INVENTION

With the increasingly high display resolution, traditional interfaces such as VGA, DVI and the like could not meet the visual demands of people. Novel digital interfaces represented by HDMI and Displayport are accordingly available.

In terms of an internal interface, an internal interface eDP (Embedded Displayport) of Displayport is produced to gradually replace the traditional LVDS.

Taking a condition in which full high definition (FHD) resolution (1920*1080) is achieved as an example, if an existing mobile industry processor interface (MIPI) is used as the internal interface of a device, at least four lanes are needed to transmit data, whereas if the eDP interface is used as the internal interface of the device, only two lanes are needed, thus compared with the MIPI interface, by adopting the eDP interface, the number of control lines may be decreased.

Meanwhile, since eDP interface protocol adopts an embedded clock signal, and MIPI protocol adopts a pair of clock signals which are separated provided, an eDP interface module has significant anti-electromagnetic interference capability, and the eDP interface may further reduce power consumption by automatically refreshing, reducing amplitude of fluctuation in power consumption, additionally providing connection options, compressing transmission data, controlling regional backlight, etc., so as to prolong the service life of a battery.

FIG. 1 is a schematic diagram of a structure of an eDP interface in the prior art. As shown in FIG. 1, the traditional eDP interface includes a clock signal generating module and an eDP data processing chip. The eDP data processing chip processes data according to a clock signal generated by the clock signal generating module and sends the processed data to a lane for transmission.

The transmission rate in a traditional eDP protocol is fixed, namely, the eDP interface includes four lanes, in each of which the transmission rate may only be one of 1.62 Gbps, 2.7 Gbps and 5.4 Gbps. The transmission rate of a lane is controlled by a clock signal, for example, if the frequency of the clock signal is a first frequency, the processing speed of the eDP data processing chip is 1.62 Gbps, and the transmission rate of the corresponding lane is 1.62 Gbps; if the frequency of the clock signal is a second frequency, the processing speed of the eDP data processing chip is 2.7 Gbps, and the transmission rate of the corresponding lane is 2.7 Gbps; if the frequency of the clock signal is a third frequency, the processing speed of the eDP data processing chip is 5.4 Gbps, and the transmission rate of the corresponding lane is 5.4 Gbps. In a transmission process, one, two or four lane(s) may be selected to transmit data according to actual demand so as to support corresponding resolution. When multiple lanes are used for transmission, the transmission rate of each lane is the same.

Since the transmission rate of the lane is defined in the traditional eDP protocol, the existing eDP interface can only support limited types of transmission rates (each lane has three transmission rates, and the selection of lane number has three options, thus nine transmission rates are supported in total), and the applicable resolution types are very limited, thereby limiting the use of the eDP interface.

SUMMARY OF THE INVENTION

The present invention provides an eDP interface and a control method of a transmission rate of the eDP interface, to effectively expand the selection of the transmission rate of each lane in the eDP interface so as to extend the application range of the eDP interface.

According to an aspect of the present invention, there is provided an eDP interface, including: a determination module, which is configured to determine whether a target transmission rate in a lane is equal to a protocol rate set in an eDP protocol; a clock signal generating module, which is configured to generate a first clock signal and a second clock signal when the target transmission rate is not equal to the protocol rate, and send the first clock signal to a first eDP data processing chip and send the second clock signal to a clock signal adjusting module; the clock signal adjusting module, which is configured to adjust a frequency of the second clock signal and send the adjusted second clock signal to a second eDP data processing chip; the first eDP data processing chip, which is configured to process data according to the first clock signal and send the processed data to the lane for transmission; and the second eDP data processing chip, which is configured to process data according to the adjusted second clock signal and send the processed data to the lane for transmission.

According to an embodiment of the present invention, the clock signal adjusting module may include a frequency division module configured to perform frequency division processing on the second clock signal, and a frequency multiplication module configured to perform frequency multiplication processing on the second clock signal subjected to the frequency division processing.

According to an embodiment of the present invention, the protocol rate may include 1.62 Gbps, 2.7 Gbps and 5.4 Gbps. A frequency of a clock signal corresponding to 1.62 Gbps is a first frequency, a frequency of a clock signal corresponding to 2.7 Gbps is a second frequency, and a frequency of a clock signal corresponding to 5.4 Gbps is a third frequency. A frequency of the first clock signal may be the first frequency or the second frequency, and the frequency of the second clock signal may be one of the first frequency, the second frequency and the third frequency.

According to an embodiment of the present invention, the frequency division module may include a divide-by-ten frequency division circuit configured to perform divide-by-ten frequency division processing on the second clock signal.

According to an embodiment of the present invention, a multiple of the frequency multiplication processing performed by the frequency multiplication module may be an integer M. When the frequency of the first clock signal is the first frequency and the frequency of the second clock signal is the second frequency, a value range of M may be [1, 3], and when both the frequency of the first clock signal and the frequency of the second clock signal are the second frequency, the value range of M may be [1, 9].

According to another aspect of the present invention, there is provided a control method of a transmission rate of an eDP interface, including the following steps: determining whether a target transmission rate in a lane is equal to a protocol rate set in an eDP protocol; generating a first clock signal and a second clock signal if the target transmission rate is not equal to the protocol rate; sending the first clock signal to a first eDP data processing chip; adjusting a frequency of the second clock signal, and sending the adjusted second clock signal to a second eDP data processing chip; processing data according to the first clock signal and sending the processed data to the lane for transmission, by the first eDP data processing chip; and processing data according to the adjusted second clock signal and sending the processed data to the lane for transmission, by the second eDP data processing chip.

According to an embodiment of the present invention, the step of adjusting a frequency of the second clock signal may include: performing frequency division processing on the second clock signal; and performing frequency multiplication processing on the second clock signal subjected to the frequency division processing.

According to an embodiment of the present invention, the protocol rate may include 1.62 Gbps, 2.7 Gbps and 5.4 Gbps. A frequency of a clock signal corresponding to 1.62 Gbps is a first frequency, a frequency of a clock signal corresponding to 2.7 Gbps is a second frequency, and a frequency of a clock signal corresponding to 5.4 Gbps is a third frequency. A frequency of the first clock signal may be the first frequency or the second frequency, and the frequency of the second clock signal may be one of the first frequency, the second frequency and the third frequency.

According to an embodiment of the present invention, divide-by-ten frequency division processing may be performed on the second clock signal.

According to an embodiment of the present invention, a multiple of the frequency multiplication processing performed on the second clock signal subjected to the frequency division processing may be an integer M. When the frequency of the first clock signal is the first frequency and the frequency of the second clock signal is the second frequency, a value range of M may be [1, 3], and when the frequency of the first clock signal and the frequency of the second clock signal are the second frequency, the value range of M may be [1, 9].

According to the eDP interface and the control method of the transmission rate of the eDP interface in the present invention, the selection of the transmission rate of each lane in the eDP interface is effectively expanded so as to extend the application range of the eDP interface.

DETAILED DESCRIPTION OF THE EMBODIMENTS

In order to enable those skilled in the art to better understand the technical solutions of the present invention, the embodiments of the present invention will be further described in detail below in combination with the accompanying drawings.

Figure 2:
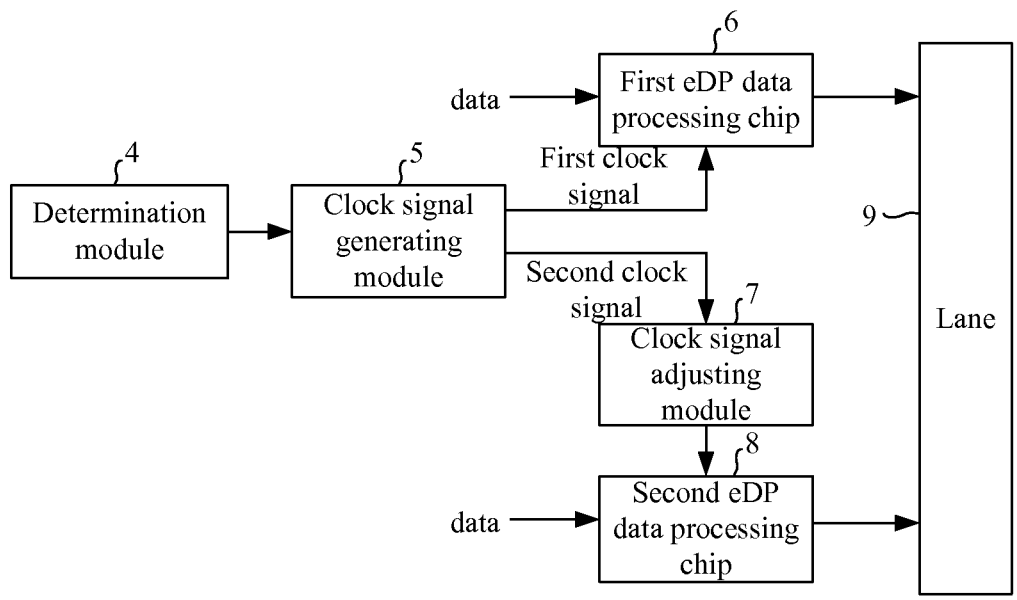
FIG. 2 is a schematic diagram of a structure of an eDP interface according to an embodiment of the present invention.

FIG. 2 is a schematic diagram of a structure of an eDP interface according to an embodiment of the present invention. As shown in FIG. 2, the eDP interface according to the embodiment of the present invention includes: a determination module 4, a clock signal generating module 5, a clock signal adjusting module 7, a first eDP data processing chip 6 and a second eDP data processing chip 8.

The clock signal generating module 5 is connected to the first eDP data processing chip 6 and the clock signal adjusting module 7, respectively, and the clock signal adjusting module 7 is connected to the second eDP data processing chip 8. The first eDP data processing chip 6 and the second eDP data processing chip 8 are respectively connected to a lane 9.

The determination module 4 is configured to determine whether a target transmission rate in the lane 9 is equal to a rate set in an eDP protocol or not. The rate according to the eDP protocol includes three rates, namely, 1.62 Gbps, 2.7 Gbps and 5.4 Gbps. The target transmission rate is determined based on the resolution of a display panel. Those skilled in the art should be aware of that, the number of lanes required to transmit data in the eDP interface and the target transmission rate in each lane can be calculated from the resolution of the display panel.

If the determination module 4 determines that the target transmission rate in the lane 9 is not equal to the protocol rate, the clock signal generating module 5 generates a first clock signal and a second clock signal, sends the first clock signal to the first eDP data processing chip 6 and sends the second clock signal to the clock signal adjusting module 7. The clock signal adjusting module 7 adjusts the frequency of the second clock signal and sends the adjusted second clock signal to the second eDP data processing chip 8. The first eDP data processing chip 6 processes data according to the first clock signal and sends the processed data to the lane 9 for transmission. The second eDP data processing chip 8 processes data according to the second clock signal adjusted by the clock signal adjusting module 7 and sends the processed data to the lane 9 for transmission.

If the determination module 4 determines that the target transmission rate in the lane 9 is equal to the protocol rate, the eDP interface according to the embodiment of the present invention may be similar to the eDP interface in the prior art, that is, the clock signal generating module 5 only generates the first clock signal and sends the first clock signal to the first eDP data processing chip 6, and the first eDP data processing chip 6 processes data according to the first clock signal and sends the processed data to the lane 9 for transmission. Under such condition, the second eDP data processing chip 8 does not work.

What differs from the prior art lies in that the eDP interface according to the embodiment of the present invention is provided with the determination module 4 and the second eDP data processing chip 8. In addition, the clock signal generating module 5 in the eDP interface according to the embodiment of the present invention may optionally generate the second clock signal to enable the second eDP data processing chip 8.

The working process of the eDP interface according to the embodiment of the present invention will be described below in combination with the accompanying drawings. Here, the frequency of a clock signal corresponding to 1.62 Gbps is a first frequency, the frequency of a clock signal corresponding to 2.7 Gbps is a second frequency, and the frequency of a clock signal corresponding to 5.4 Gbps is a third frequency.

When the determination module 4 determines that the target transmission rate is equal to the protocol rate, that is, the transmission rate of the lane 9 is one of 1.62 Gbps, 2.7 Gbps and 5.4 Gbps, the clock signal generating module 5 only generates the first clock signal, and only the first eDP data processing chip 6 processes data. Under such condition, the frequency of the first clock signal may be one of the first frequency, the second frequency and the third frequency, correspondingly, the first eDP data processing chip 6 processes data at one of 1.62 Gbps, 2.7 Gbps and 5.4 Gbps, thus, the data transmission rate in the lane 9 may be correspondingly one of 1.62 Gbps, 2.7 Gbps and 5.4 Gbps. The entire process is similar to the prior art and will not be repeated herein.

When the determination module 4 determines that the target transmission rate is not equal to the protocol rate, that is, the transmission rate of the lane 9 is not one of 1.62 Gbps, 2.7 Gbps and 5.4 Gbps, the clock signal generating module 5 generates the first clock signal and the second clock signal. At this time, both the first eDP data processing chip 6 and the second eDP data processing chip 8 process data.

Figure 1:
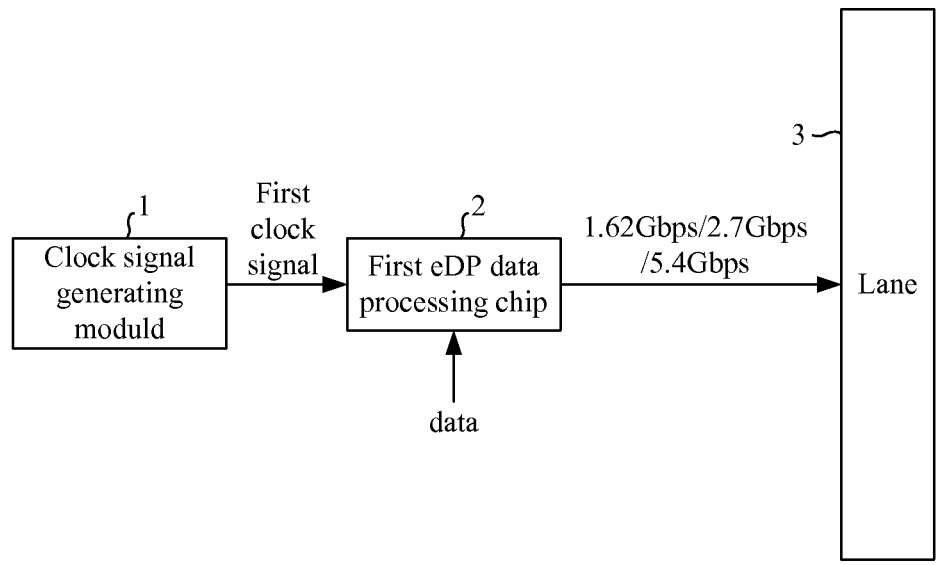
FIG. 1 is a schematic diagram of a structure of an eDP interface in the prior art.
Figure 3:
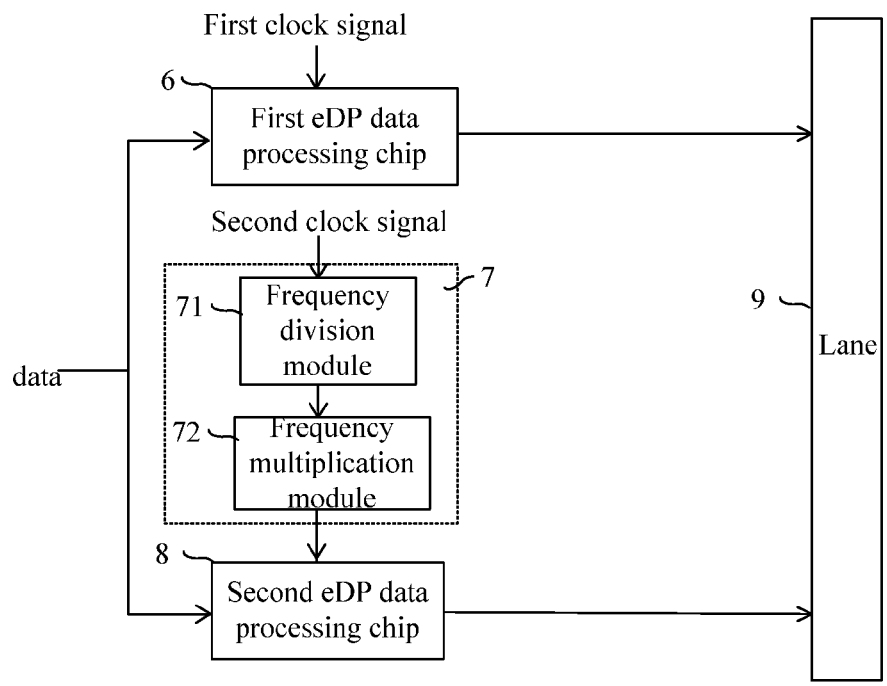
FIG. 3 is a schematic diagram illustrating that first and second eDP data processing chips in FIG. 1 work simultaneously.

FIG. 3 is a schematic diagram illustrating that the first eDP data processing chip 6 and the second eDP data processing chip 8 in FIG. 1 work simultaneously. As shown in FIG. 3, the frequency of the first clock signal is the first frequency or the second frequency, and the frequency of the second clock signal may be one of the first frequency, the second frequency and the third frequency. Since the maximum transmission rate supported by each lane is 5.4 Gbps, and the target transmission rate is not equal to the protocol rate, that is, the target transmission rate should be smaller than 5.4 Gbps (5.4 Gbps is one of the protocol rates), the data processing speeds of the first eDP data processing chip 6 and the second eDP data processing chip 8 should be smaller than 5.4 Gbps. Therefore, the frequency of the first clock signal could not be the third frequency corresponding to 5.4 Gbps. Since the second clock signal has been processed by the clock signal adjusting module 7 before arriving at the second eDP data processing chip 8, the frequency of the second clock signal may be reduced, such that the data processing capability of the second eDP data processing chip 8 may be reduced proportionally, and as a result, the frequency of the second clock signal may be one of the first frequency, the second frequency and the third frequency.

According to an embodiment of the present invention, the clock signal adjusting module 7 includes a frequency division module 71 and a frequency multiplication module 72, as shown in FIG. 3. The clock signal generating module 5 is connected to the frequency division module 71, the frequency division module 71 is connected to the frequency multiplication module 72, and the frequency multiplication module 72 is connected to the second eDP data processing chip 8. The frequency division module 71 is configured to perform frequency division processing on the second clock signal, and the frequency multiplication module 72 is configured to perform frequency multiplication processing on the second clock signal subjected to the frequency division processing.

Referring to FIG. 3 again, a detailed description will be given below by taking a the condition that the frequency of the second clock signal is the second frequency and the frequency division module 71 is configured to perform divide-by-ten frequency division processing on the second clock signal. Under such condition, the frequency division module 71 includes a divide-by-ten frequency division circuit, and the multiple of the frequency multiplication processing performed by the frequency multiplication module 72 is an integer M. Table 1 shows the relationship between the data transmission rate in the lane 9 and the first clock frequency, the second clock frequency and M, and is shown as below:

TABLE 1

| Frequency of the first clock signal | Frequency of the second clock signal | Multiple of frequency multiplication M | Data transmission rate in the lane |
|---|---|---|---|
| First frequency | None | None | 1.62 Gbps |
| First frequency | Second frequency | 1 | 1.89 Gbps |
| First frequency | Second frequency | 2 | 2.16 Gbps |
| First frequency | Second frequency | 3 | 2.43 Gbps |
| Second frequency | None | None | 2.70 Gbps |
| Second frequency | Second frequency | 1 | 2.97 Gbps |
| Second frequency | Second frequency | 2 | 3.24 Gbps |
| Second frequency | Second frequency | 3 | 3.51 Gbps |
| Second frequency | Second frequency | 4 | 3.78 Gbps |
| Second frequency | Second frequency | 5 | 4.05 Gbps |
| Second frequency | Second frequency | 6 | 4.32 Gbps |
| Second frequency | Second frequency | 7 | 4.59 Gbps |
| Second frequency | Second frequency | 8 | 4.86 Gbps |
| Second frequency | Second frequency | 9 | 5.13 Gbps |
| Third frequency | None | None | 5.40 Gbps |

It can be seen from the above Table 1 that, according to the embodiment of the present invention, the data transmission rate in the lane 9 may not only be the protocol rate 1.62 Gbps, 2.7 Gbps or 5.4 Gbps, but may also be other value between 1.62 Gbps and 5.4 Gbps. When the target transmission rate of the lane 9 is one of the protocol rates 1.62 Gbps, 2.7 Gbps and 5.4 Gbps, the clock signal generating module 5 only generates the first clock signal and enables the first eDP data processing chip 6 only. When the transmission rate of the lane 9 is not one of the protocol rates 1.62 Gbps, 2.7 Gbps and 5.4 Gbps, the clock signal generating module 5 simultaneously generates the first clock signal and the second clock signal. When the frequency of the first clock signal is the first frequency and the frequency of the second clock signal is the second frequency, the value range of M is [1, 3]; when the frequency of the first clock signal and the frequency of the second clock signal are the second frequency, the value range of M is [1, 9].

Due to the co-processing of the first eDP data processing chip 6 and the second eDP data processing chip 8, multiple data transmission rates besides the protocol rates in the lane 9 are achieved. Therefore, the application range of the eDP interface is greatly expanded.

Taking that the transmission rate of the lane 9 is 3.78 Gbps as an example, at this time, both the frequency of the first clock signal and the frequency of the second clock signal are the second frequency, the frequency division module 71 performs divide-by-ten frequency division processing on the second clock signal whose frequency is the second frequency to convert the frequency of the second clock signal into 1/10 of the second frequency, the frequency multiplication module 72 then performs process of frequency multiplication by four (namely, M is equal to 4) on the second clock signal subjected to the frequency division processing to convert the frequency of the second clock signal into 4/10 of the second frequency, and the second eDP data processing chip 8 is controlled by the clock signal of this frequency, so that the processing capability of the second eDP data processing chip 8 is changed proportionally, that is, the processing rate of the second eDP data processing chip 8 becomes 4/10 of 2.7 Gbps, namely, 1.08 Gbps. The processing rate of the first eDP data processing chip 6 controlled by the first clock signal of the second frequency is 2.7 Gbps. At this time, the sum of the processing speeds of the first eDP data processing chip 6 and the second eDP data processing chip 8 is as follows: 1.08 Gbps+2.7 Gbps=3.78 Gbps, thus the target transmission rate of the lane 9, namely 3.78 Gbps, is achieved.

It should be noted that, the case in which the frequency division module 71 includes the divide-by-ten frequency division circuit and the frequency of the second clock signal is the second frequency is merely exemplary, but not limit the technical solutions of the present invention. The frequency of the second clock signal may also be the first frequency or the third frequency. The cases (wherein, the frequency division module 71 includes the divide-by-ten frequency division circuit also) in which the frequency of the second clock signal is the first frequency and the third frequency are respectively shown in Table 2 and Table 3.

TABLE 2

| Frequency of the first clock signal | Frequency of the second clock signal | Multiple of frequency multiplication M | Data transmission rate in the lane |
|---|---|---|---|
| First frequency | None | None | 1.62 Gbps |
| First frequency | First frequency | 1 | 1.78 Gbps |
| First frequency | First frequency | 2 | 1.94 Gbps |
| First frequency | First frequency | 3 | 2.10 Gbps |
| First frequency | First frequency | 4 | 2.27 Gbps |
| First frequency | First frequency | 5 | 2.43 Gbps |
| First frequency | First frequency | 6 | 2.59 Gbps |
| First frequency | None | None | 2.70 Gbps |
| Second frequency | First frequency | 1 | 2.86 Gbps |
| Second frequency | First frequency | 2 | 3.02 Gbps |
| Second frequency | First frequency | 3 | 3.19 Gbps |
| Second frequency | First frequency | 4 | 3.35 Gbps |
| Second frequency | First frequency | 5 | 3.51 Gbps |
| Second frequency | First frequency | 6 | 3.67 Gbps |
| Second frequency | First frequency | 7 | 3.83 Gbps |
| Second frequency | First frequency | 8 | 4.00 Gbps |
| Second frequency | First frequency | 9 | 4.16 Gbps |
| Second frequency | First frequency | 10 | 4.32 Gbps |
| Second frequency | First frequency | 11 | 4.48 Gbps |
| Second frequency | First frequency | 12 | 4.64 Gbps |
| Second frequency | First frequency | 13 | 4.81 Gbps |
| Second frequency | First frequency | 14 | 4.97 Gbps |
| Second frequency | First frequency | 15 | 5.13 Gbps |
| Second frequency | First frequency | 16 | 5.29 Gbps |
| Third frequency | None | None | 5.40 Gbps |

TABLE 3

| Frequency of the first clock signal | Frequency of the second clock signal | Multiple of frequency multiplication M | Data transmission rate in the lane |
|---|---|---|---|
| First frequency | None | None | 1.62 Gbps |
| First frequency | Third frequency | 1 | 2.16 Gbps |
| Second frequency | None | None | 2.70 Gbps |
| Second frequency | Third frequency | 1 | 3.24 Gbps |
| Second frequency | Third frequency | 2 | 3.78 Gbps |
| Second frequency | Third frequency | 3 | 4.32 Gbps |
| Second frequency | Third frequency | 4 | 4.86 Gbps |
| Third frequency | None | None | 5.40 Gbps |

Figure 4:
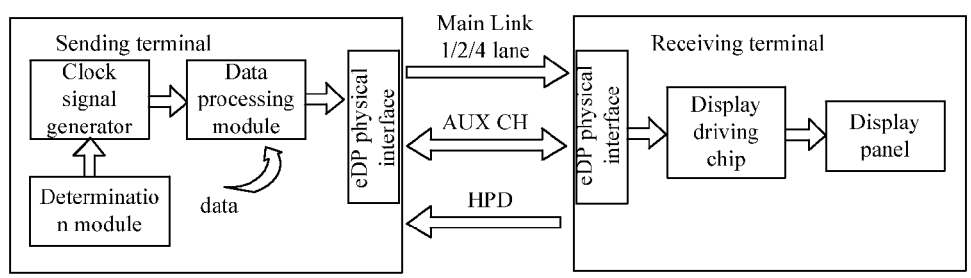
FIG. 4 is a schematic diagram of an eDP interface according to an embodiment of the present invention applied in a communication device.

The eDP interfaces according to the embodiments of the present invention may be applied in various communication devices as internal interfaces. FIG. 4 is a schematic diagram of an eDP interface according to an embodiment of the present invention applied in a communication device. As shown in FIG. 4, connection is established between a sending terminal at the left side and a receiving terminal at the right end through an eDP physical interface and data is transmitted through a main link. The determination module determines whether the target transmission rate is equal to the protocol rate or not, and controls, according to the determination result, the clock signal generating module to generate the first clock signal or simultaneously generate the first clock signal and the second clock signal. A data processing module includes the first eDP data processing chip and the second eDP data processing chip. One lane, two lanes or four lanes may be selected in the main link to transmit data. In FIG. 4, AUX CH represents an auxiliary lane, and HPD represents a detection lane.

After data are transmitted from the eDP physical interface of the sending terminal to the eDP physical interface of the receiving terminal, a display driving chip drives the display panel to display. It should be noted that, in the technical solutions of the present invention, the type of the display panel is not limited, and the display panel may be (but not limited to) a thin film transistor (referred to as TFT) type display panel, an organic electroluminesence display (OLED) type display panel or the like.

Figure 5:
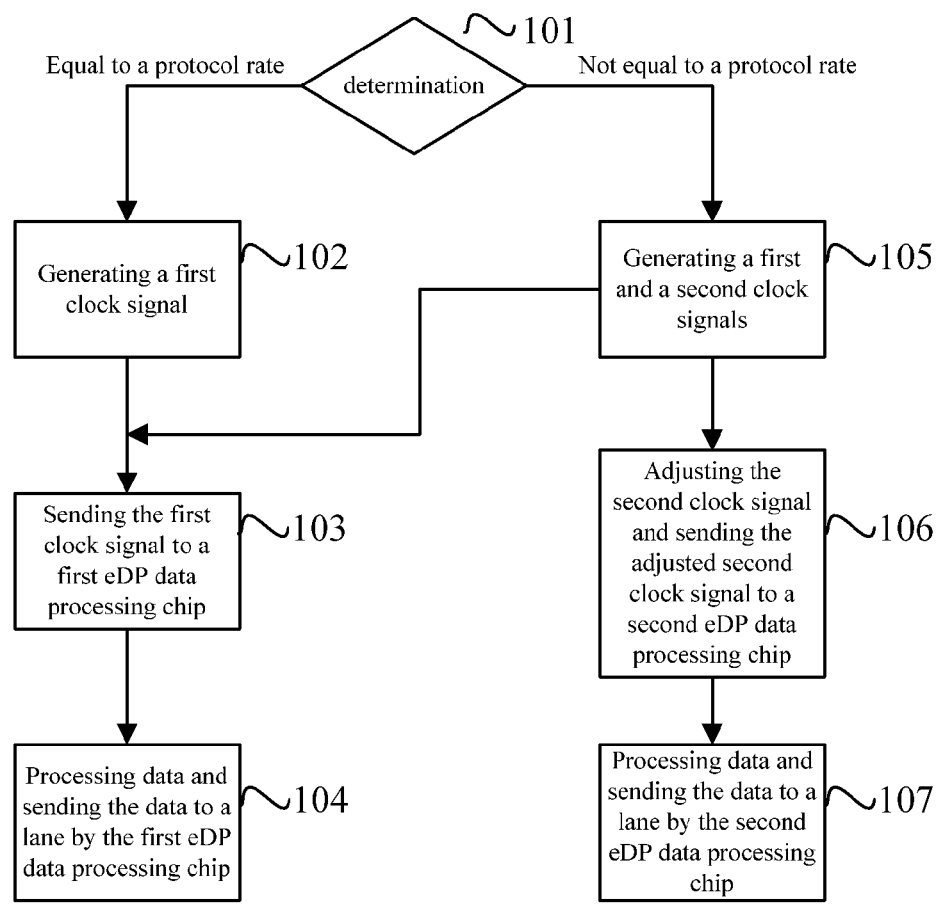
FIG. 5 is a flowchart of a control method of a transmission rate of an eDP interface according to an embodiment of the present invention.

FIG. 5 is a flowchart of a control method of a transmission rate of an eDP interface according to an embodiment of the present invention. As shown in FIG. 5, whether a target transmission rate in a lane is equal to a protocol rate set in an eDP protocol is determined firstly (101). Three transmission rates, namely, 1.62 Gbps, 2.7 Gbps and 5.4 Gbps, are defined in the eDP protocol. Specifically, in step 101, whether the target transmission rate is equal to one of 1.62 Gbps, 2.7 Gbps and 5.4 Gbps is determined.

If the target transmission rate is equal to the protocol rate, a first clock signal is generated (102), the first clock signal is then sent to a first eDP data processing chip (103), and the first eDP data processing chip processes data according to the first clock signal and sends the processed data to the lane for transmission (104).

If the target transmission rate is not equal to the protocol rate, the first clock signal and a second clock signal are generated (105). The first clock signal is sent to the first eDP data processing chip (103), the frequency of the second clock signal is adjusted, and the adjusted second clock signal is sent to a second eDP data processing chip (106). The first eDP data processing chip processes data according to the first clock signal and sends the processed data to the lane for transmission (104), and the second eDP data processing chip processes data according to the adjusted second clock signal and sends the processed data to the lane for transmission (107).

In step 106, the step of adjusting the frequency of the second clock signal may include steps of: performing frequency division processing on the second clock signal; and performing frequency multiplication processing on the second clock signal subjected to the frequency division processing.

It should be noted that, the first eDP data processing chip and the second eDP data processing chip may simultaneously process data, that is, step 104 and step 107 may be performed synchronously.

It may be understood that, the above implementations are merely exemplary implementations used for describing the principle of the present invention, rather than limiting the present invention. Various variations and improvements may be made by those of ordinary skill in the art without departing from the spirit and essence of the present invention, and these variations and improvements may be encompassed within the protection scope of the present invention.

The invention claimed is:

1. An eDP interface, comprising:
   a determination module, which is configured to determine whether a target transmission rate in a lane is equal to a protocol rate set in an eDP protocol;
   a clock signal generating module, which is configured to generate a first clock signal and a second clock signal when the target transmission rate is not equal to the protocol rate, and send the first clock signal to a first eDP data processing chip and send the second clock signal to a clock signal adjusting module;
   the clock signal adjusting module, which is configured to adjust a frequency of the second clock signal and send the adjusted second clock signal to a second eDP data processing chip;
   the first eDP data processing chip, which is configured to process data according to the first clock signal and send the processed data to the lane for transmission; and
   the second eDP data processing chip, which is configured to process data according to the adjusted second clock signal and send the processed data to the lane for transmission.

2. The eDP interface of claim 1, wherein, the clock signal adjusting module comprises a frequency division module configured to perform frequency division processing on the second clock signal, and a frequency multiplication module configured to perform frequency multiplication processing on the second clock signal subjected to the frequency division processing.

3. The eDP interface of claim 2, wherein, the protocol rate comprises 1.62 Gbps, 2.7 Gbps and 5.4 Gbps, and a frequency of a clock signal corresponding to 1.62 Gbps is a first frequency, a frequency of a clock signal corresponding to 2.7 Gbps is a second frequency, and a frequency of a clock signal corresponding to 5.4 Gbps is a third frequency,
   wherein, a frequency of the first clock signal is the first frequency or the second frequency, and the frequency of the second clock signal is one of the first frequency, the second frequency and the third frequency.

4. The eDP interface of claim 3, wherein the frequency division module comprises a divide-by-ten frequency division circuit, configured to perform divide-by-ten frequency division processing on the second clock signal.

5. The eDP interface of claim 4, wherein a multiple of the frequency multiplication processing performed by the frequency multiplication module is an integer M, wherein
   when the frequency of the first clock signal is the first frequency and the frequency of the second clock signal is the second frequency, a value range of M is [1, 3], and
   when the frequency of the first clock signal and the frequency of the second clock signal are the second frequency, the value range of M is [1, 9].

6. A control method of a transmission rate of an eDP interface, comprising the steps of:
   determining whether a target transmission rate in a lane is equal to a protocol rate set in an eDP protocol;
   generating a first clock signal and a second clock signal if the target transmission rate is not equal to the protocol rate;
   sending the first clock signal to a first eDP data processing chip;
   adjusting a frequency of the second clock signal, and sending the adjusted second clock signal to a second eDP data processing chip;
   processing data according to the first clock signal and sending the processed data to the lane for transmission, by the first eDP data processing chip; and
   processing data according to the adjusted second clock signal and sending the processed data to the lane for transmission, by the second eDP data processing chip.

7. The control method of the transmission rate of the eDP interface of claim 6, wherein the step of adjusting the frequency of the second clock signal comprises:
   performing frequency division processing on the second clock signal; and
   performing frequency multiplication processing on the second clock signal subjected to frequency division processing.

8. The control method of a transmission rate of an eDP interface of claim 7, wherein the protocol rate comprises 1.62 Gbps, 2.7 Gbps and 5.4 Gbps, a frequency of a clock signal corresponding to 1.62 Gbps is a first frequency, a frequency of a clock signal corresponding to 2.7 Gbps is a second frequency, and a frequency of a clock signal corresponding to 5.4 Gbps is a third frequency,
   wherein a frequency of the first clock signal is the first frequency or the second frequency, and the frequency of the second clock signal is one of the first frequency, the second frequency and the third frequency.

9. The control method of a transmission rate of an eDP interface of claim 8, wherein divide-by-ten frequency division processing is performed on the second clock signal.

10. The control method of a transmission rate of an eDP interface of claim 9, wherein a multiple of the frequency multiplication processing performed on the second clock signal subjected to the frequency division processing is an integer M, wherein
    when the frequency of the first clock signal is the first frequency and the frequency of the second clock signal is the second frequency, a value range of M is [1, 3], and
    when the frequency of the first clock signal and the frequency of the second clock signal are the second frequency, the value range of M is [1, 9].

* * * * *